May 28, 1968
F. A. ROBY, JR
3,385,474
APPARATUS FOR AUTOMATICALLY INTRODUCING CHEMICAL
CONCENTRATES INTO SWIMMING POOLS
Filed Feb. 9, 1967
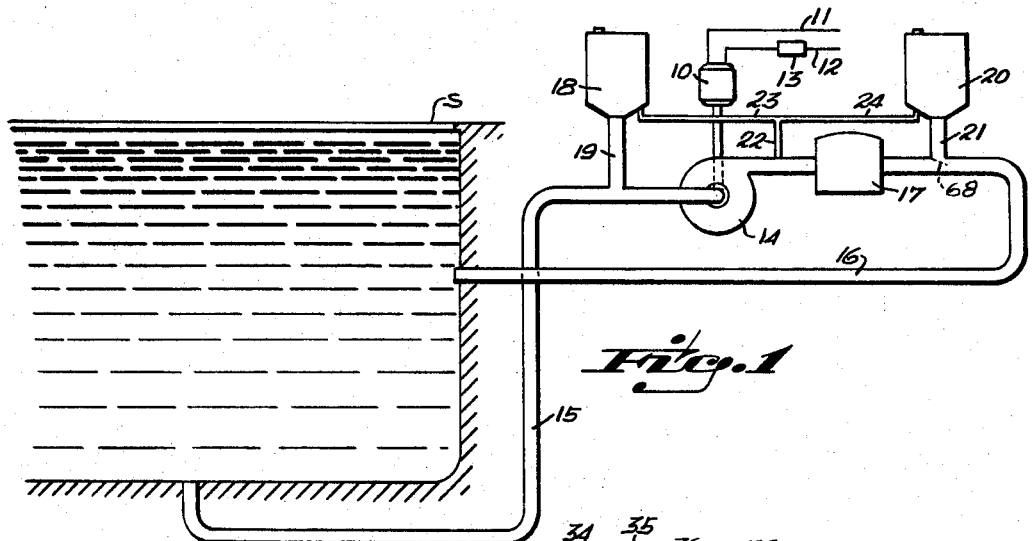
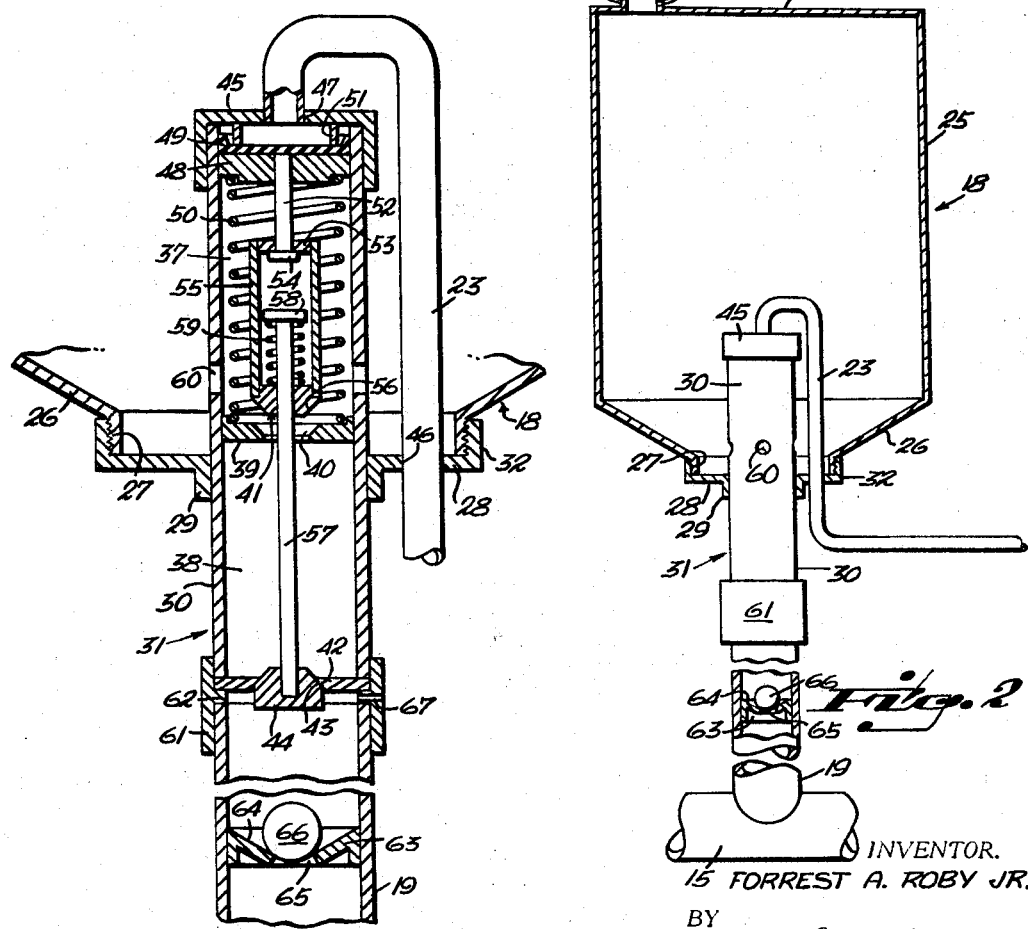
INVENTOR.
FORREST A. ROBY JR.
BY
E. H. Schmidt
ATTORNEY.

_United States Patent Office_

3,385,474
Patented May 28, 1968

3,385,474
APPARATUS FOR AUTOMATICALLY INTRODUC-
ING CHEMICAL CONCENTRATES INTO SWIM-
MING POOLS
Forrest A. Roby, Jr., 4920 Fillmore St.,
Hollywood, Fla. 33021
Continuation-in-part of application Ser. No. 426,055,
Jan. 18, 1965. This application Feb. 9, 1967, Ser.
No. 614,870
9 Claims. (Cl. 222—57)

My invention relates to apparatus for automatically adding quantities of chemical solutions or granular chemical concentrates into a fluid flow system, and is directed particularly to such apparatus for automatically adding chlorine and acid, or otherwise chemically treating swimming pool installations for continuously maintaining water that is safe and healthful for swimming. The present application is a continuation-in-part of an application filed by me on Jan. 18, 1965, Ser. No. 426,055, titled Automatic Swim Pool Maintenance System, now abandoned.

At the present time it is common practice, particularly in home swimming pool installations, to periodically add chemicals, such as chlorine and acid to the pool water, to maintain it at a low bacteria level safe for swimming. This procedure, which is usually done manually, is hazardous because of the caustic nature of the chemical concentrates used. If the pool is used often, moreover, the addition of chemicals in a large pool becomes a daily necessity, and thus a time consuming and disagreeable chore.

It is accordingly the principal object of my invention to provide a device for automatically adding measured amounts of chemical concentrates to swimming pools on a daily basis in order that the pool be properly maintained without the necessity for adding chemicals by hand.

It is a more particular object to provide chemical adding apparatus of the character above described wherein the measured quantities of chemicals to be automatically added can readily be changed from time to time, as may be required to adjust for weather changes and to adjust for frequency of use of the pool, for example.

Another object is to provide a chemical adding apparatus that minimizes the formation of chemical deposits or sludge at the bottom of the pool.

Yet another object is to provide apparatus for automatically, chemically treating swimming pools which can conveniently be operated in conjunction with the usual automatic pool pump and filter system, and which can be controlled by the mechanism thereof.

Still another object is to provide an apparatus of the above nature which will be low in cost, simple in structure and operation and long-wearing in use.

Other objects, features and advantages of the invention will be apparent from the following description when read with reference to the accompanying drawings.

In the drawings, wherein like reference numerals denote corresponding parts throughout the several views:

FIG. 1 illustrates, schematically, a pool treating apparatus embodying the invention shown in association with a typical home pool pump and filter system;

FIG. 2 is an elevational view, partly in section, illustrating constructional details of one of the chemical storage containers and its associated metering and discharge unit; and FIG. 3 is an enlarged view of the metering and discharge unit, shown separately and in vertical cross section to illustrate constructional details.

The invention, in brief, resides in the provision of two storage containers or hoppers, one for acid and one for chlorine, each being sufficiently large to hold a month's supply or more of the chemicals, the chlorine container including a metering and discharge unit operative to periodically feed measured amounts of chlorine into the pool filter circulatory system ahead of the filter pump and before passing through the filter, and the acid container containing a similar metering and discharge unit operative simultaneosuly to feed measured amounts of acid into the pool filter circulatory system after the chlorine treated water passes out of the filter and before being returned to the pool. The chemical storage containers or hoppers and their associated metering and discharge units are substantially the same in construction and may be identical. A salient feature of the invention resides in the construction of the metering and discharge units whereby discrete amounts of the chemicals are released into the pump and filter circulatory system in response to water pressure generated at the pump at the beginning of its cyclical period of operation. Thus, the usual electric time clock that automatically controls the cyclical operation of the pool filtering system serves indirectly to effect operation of the chemical treating apparatus embodying my invention.

Referring now to FIG. 1 of the drawings, 10 designates the electrical pump motor of the pool filter system, the same being energized by the usual 110 or 220 volt alternating current source of household supply through a pair of electrical conductors 11, 12, conductor 12 of which has series-connected a clock switch indicated at 13, serving to energize said pump motor for a pre-determined period once during every cycle of operation, which may occur only once during a twenty-four-hour period, or twice or more depending upon the size of the pool, its use and weather conditions, for example. The pump motor 10 drives a water pump 14, the input of which leads back to said pool through an output conduit 16 after passing through a series-connected pool filter 17. Since construction and operation of clock switch controlled pool filter circulatory systems is well-known, such systems are not further described herein, only so much thereof being shown and described as is deemed necessary to illustrate a preferred use of my improved apparatus for automatically chemically treating swimming pools embodying the invention in association therewith.

As illustrated in FIG. 1, the invention comprises a first chemical adding unit 18 located above the filter system input conduit 15 to periodically introduce, by gravity feed, as hereinbelow described, measured amounts of chlorine through a first vertical conduit 19, and a second chemical adding unit 20, located above the filter system output conduit 16 at the output side of the filter to similarly periodically introduce measured amounts of acid through a second vertical conduit 21. As hereinbelow described, the chemical adding units 18 and 20 are controlled with respect to their periodic introduction of chemicals by the operation of the filter water pump 14, this being effected by the increase in water pressure at the output side of the pump being imparted to the metering and discharge units comprising said chemical adding units through conduits 22, 23 and 24 communicating between the output conduit 16 from said pump and said metering discharge units. Since the chemical adding units 18 and 20 are preferably identical in construction, differing only as may be appropriate with respect to the size of their hoppers or storage containers and the size of the measuring chambers determining the precise amounts of chemicals, whether in chemical solution or granular form, to be added, only the first unit 18 will be described in detail herein by way of example.

As illustrated in FIG. 2, the chemical adding unit 18 comprises a cylindrical storage container member 25 having a downwardly-extending frusto-conical bottom wall portion 26 terminating in a central, outwardly-extending annular flange portion 27. The container member 25 is made of a chemically inert material such as polyethylene or one or more of the chemically resistant thermosetting synthetic plastics, for example, so as not be affected by chemicals passing therethrough. All other components of chemical adding units 18 and 20 and their associated conduits are similarly of chemically inert materials. The annular flange portion 27 is externally threaded to receive screwed thereon the threaded flange 32 of a cap member 28. The cap member 28 is formed with an outwardly-extending, annular skirt 29 defining a central opening coaxial with the longitudinal axis of the container member 25 and encircling the outer peripheral wall of a tubular housing member 30 comprising a metering and discharge unit 31. The tubular housing member 30 is secured about mid-way along its length to the cap skirt 29. The container member 25 further comprises an integral top wall 33 having a short, upwardly-extending filler neck 34 fitted with a removable cap 35. The filler neck 34 is formed with a lateral through opening 36 permitting the entrance of replacement air upon flow of the contained chemical down into the metering and discharge unit 31.

The housing member 30 comprising metering and discharge unit 31 is divided into interior upper and lower chambers 37, 38, respectively, by means of a central annular partition 39 formed with an upwardly-extending coaxial beveled circular valve seat 40, normally open but adapted to be closed off by a valve head member 41, as hereinbelow described. The lower end of the housing member is similarly fitted with an annular partition 42 formed with a downwardly-extending coaxial, beveled valve seat 43 normally closed by a valve head member 44 but adapted to be opened as hereinafter described to discharge metered amounts of chemical.

The upper end of the housing member 30 is sealed off by a cap 45. The conduit 23 extends through an opening 46 of the cap member 28, whereat it is sealed to prevent leakage around said conduit, to terminate in communication with a central opening 47 in the cap 45. A piston disk 48 is slidably arranged within the upper chamber 37 of the housing member 30, said piston member having affixed to its upper end a resilient sealing disk 49 which may be of neoprene, for example, and which serves to prevent water leakage down past said piston. A helical compression spring 50 within the upper chamber 37 and constrained between the underside of the piston disk 48 and the upper surface of the annular partition 39 normally urges said piston to its uppermost position within said chamber, said uppermost position being limited by abutment of the upper surface of the sealing disk 49 against the lower edge of an annular stop member 51 fixed against and extending down from the underside of the cap 45.

Fixed with respect to and extending downwardly coaxially from the piston disk 48 is a piston rod 52 which extends slidingly through a central opening in the top wall 53 of the valve head 41 and terminates in a head portion 54 preventing withdrawal of said rod from said valve head. The valve head 41 also comprises a coaxial, elongated tubular body portion 55 terminating in a frusto-conical valve closure member 56 adapted to seal off the valve seat 40 during operation of the device as hereinafter described. The valve closure member 56 is formed with a central, axially-extending bore slidingly received within which is a coaxially-extending shaft 57. The upper end of the shaft 57 is formed with a head 58 against the underside of which is seated the upper end of a compression spring 59 circumjacently arranged with respect to said shaft. The lower end of the compression spring 59 seats against the inside of the valve closure member 56, thereby constraining the shaft upwardly with respect to and within the valve head 41. The valve head member 44 is fixed to the lower end of the shaft 57 and said head member is in seating or closing relation with respect to the valve seat 43 when the metering and discharge unit is in unactuated condition, as illustrated in FIG. 3.

As illustrated in FIGS. 2 and 3, the housing member 30 of the metering and discharge unit 31 is provided with a plurality of peripherally-spaced openings 60 at a position slightly above the cap member 28 to permit flow of the contained chemical, whether in fluid solution or granular form, into the lower chamber 38 of said housing member through its upper chamber 37 and the normally open valve seat 40.

As a means of connection between the lower end of the metering and discharge unit 31 and the upper end of the vertical conduit 19, a sleeve coupling 61 is preferably used, one end of which is cemented or otherwise secured about said lower end and the other end of which is frictionally retained over the upper end of said vertical conduit for ease of removal for cleaning and the like when necessary. The sleeve coupling 61 is formed with an interior annular flange portion 62 through which a lateral opening 67 is drilled to permit the inflow of air to replace the chemical charge dispensed through the lower valve seat opening 43 upon actuation of the device.

Means is provided for sealing off the upper end of the vertical conduit 19 after a charge of chemical solution has been dispensed therethrough. To this end, at a distance below the top of the vertical conduit 19 somewhat greater than the length of the lower chamber 38 of the metering and discharge unit housing 31, there is arranged within said conduit a valve seat member 63 having a concave valve seat 64 defining a central opening 65. Normally seated upon the valve seat 64 in seating engagement with the opening 65 thereof is a spherical valve closure member 66 of such density as to float upon any fluid within the upper end of the vertical conduit member 19 until it passes through said valve opening. After the fluid is discharged, the reduced pressure in the input conduit to the pump created by the operation thereof will maintain the spherical valve closure member 66 in tightly seated position on its valve seat 64, thereby preventing leakage during operation of the pump.

Considering now the operation of the apparatus, it will first be noted, with reference to FIG. 3 of the drawings, that when in unactuated condition, chemical from within the container 25 will, as hereinabove described, flow into and fill the lower chamber 38 of the metering and discharge unit 31. As described above, the valve seat 43 will be closed off, so that a discrete charge of the chemical to be added, in an amount dependent upon the volumetric size of the lower chamber 38, is normally available to be discharged into the pool water circulatory system upon actuation of the device.

When the next cycle of filter pump operation begins, as controlled by the clock switch 13 in energizing the pump motor 10, operation of the water pump 14 will effect a substantial increase in the water pressure at the output conduit 16. Such an increase of water pressure will be immediately apparent against the upper surface of the piston sealing disk 49 through the conduits 22 and 23, thereby forcing the piston 48 down against the reactive force of the yieldable compression spring 50. Such downward movement of the piston 48 permits lowering of the valve head 41 under the influence of the compressional force of the spring 59, it being understood that the main spring 50 will be of such strength as normally overrides the reactive force of the spring 59. At an intermediate position of the piston 48 in its downward movement within the upper chamber 37, the valve head 41 will seal the valve seat 40 so as to close off the chemical flow path between the upper and lower chambers 37 and 38, respectively. Since at such intermediate position the underside of the piston rod head 54 will not quite have reached the shaft head 58 associated with the lower chamber valve head 44, flow of chemical from the container 25 down into the vertical conduit 19 cannot occur. Upon slight further downward movement of the piston 48, the piston rod head 54 will abut the shaft head 58, causing depression of the shaft 57 and consequent opening of the lower valve seat 43 due to unseating of the valve head 44. When this occurs, the metered amount of chemical contained in the lower chamber 38 will be discharged through the vertical conduit 19, it being understood that the chemical solution will float the valve ball 66 to unseat it from its associated valve seat opening 65 to permit the flow of chemical, chlorine from the first chemical adding unit 18, by way of example, into the input conduit leading to the pool filter 17. The opening 67 serves to allow replacement air to enter, as described above.

It will be apparent that the chemical will be discharged into the pool circulatory system within the first few seconds of pump operation. Since the chlorine is introduced ahead of the pool filter 17, any precipitates formed by reaction of the chlorine with impurities in the pool water will be filtered out before the return of the pool water being filtered to the pool, thereby minimizing the possibility of sludge from this source collecting at the bottom of the pool.

As a practical matter, it has been found that the length of the vertical conduit 19 must be such as to support the metering and discharge unit 31 at a position approximately fifteen inches above the level of the pool water surface to prevent backwash of water, due to its momentum, flowing up into said vertical conduit and reaching as far as the underside of the metering and discharge unit 31 upon the cessation of operation of the water pump 14.

With respect to the operation of the metering unit associated with the second chemical adding unit 20 (not illustrated) it is to be noted that being in connection with the output side of the pump 14, water flows past the lower end of the vertical chemical dispensing conduit 21 under substantial pressure. In order to prevent such pressure forcing water up into the vertical conduit 21, a venturi in the form of a baffle plate 68, or the like (see FIG. 1), is provided to reduce the pressure sufficiently at the lower end of such conduit to exhaust the chemical, acid solution, for example, from the second chemical adding unit 20 when discharged as described above into the conduit 16 of the pool filter flow system. It is to be noted that the acid is added at a point in the filter flow system beyond rather than before the water pump 14 and filter 17, so as to prevent such corrosion and pitting of the internal surfaces thereof as would otherwise occur.

It is also to be noted that the length of the vertical conduit 21 also will be such as to keep the second chemical adding unit 20 sufficiently above the pool water level to prevent flooding thereof under all conditions of operation.

While there is illustrated and described herein only one form in which the invention can conveniently be embodied in practice, it is to be understood that this form is presented by way of example only, and not in a limiting sense. The invention, in brief, comprises all the embodiments and modifications coming within the scope and spirit of the following claims.

What I claim as new and desire to secure by Letters Patent is:

1. In a device for automatically dispensing discrete amounts of chemical concentrate into swimming pools and the like, the combination comprising, an elongated, tubular housing member, a transverse valve member fixed within and with respect to said housing member intermediate its ends and dividing said housing member into upper and lower cylindrical chambers, said valve member having a central opening defining a first valve seat, a lower end valve member at the lower chamber end of said housing member and having a central opening defining a second valve seat, a piston member slidingly disposed within the upper chamber of said housing member, means normally resiliently constraining said piston to an outermost position in said housing member, means for applying water under pressure to the outer end of said piston member for forcing said piston inwardly within said upper chamber, a first valve head within said housing member and movable between seated and unseated positions with respect to said first valve seat and normally in said unseated position, a second valve head movable between seated and unseated positions with respect to said second valve seat and normally in said seated position, an opening in the side wall of said housing member communicating with said upper chamber, and means controlled by the movement of said piston inwardly in said upper chamber sequentially to move said first valve head to seated position with respect to said first valve seat and move said second valve head to unseated position with respect to said second valve seat.

2. A device for automatically dispensing discrete amounts of chemical concentrate as defined in claim 1, including a container surrounding said housing member and defining an interior chamber in communication with the side wall opening thereof.

3. A device for automatically dispensing discrete amounts of chemical concentrate as defined in claim 2, wherein said piston constraining means comprises a first helical compression spring acting between the underside of said piston member and the upper chamber side of said transverse valve member.

4. In a device for automatically dispensing discrete amounts of chemical concentrate into swimming pools and the like, the combination comprising, an elongated, tubular housing member, a transverse valve member within said housing member intermediate its ends and dividing said housing member into upper and lower cylindrical chambers, said valve member having a central opening defining a first valve seat, a lower end valve member at the lower chamber end of said housing member and having a central opening defining a second valve seat, a piston member slidingly disposed within the upper chamber of said housing member, means normally resiliently constraining said piston to an outermost position in said housing member, means for applying water under pressure to the outer end of said piston member for forcing said piston inwardly within said upper chamber, a first valve head within said housing member and movable between seated and unseated positions with respect to said first valve seat and normally in said unseated position, a second valve head movable between seated and unseated positions with respect to said second valve seat and normally in said seated position, an opening in the side wall of said housing member communicating with said upper chamber, means controlled by the movement of said piston inwardly in said upper chamber sequentially to move said first valve head to seated position with respect to said first valve seat and move said second valve head to unseated position with respect to said second valve seat, a container surrounding said housing member and defining an interior chamber in communication with the side wall opening thereof, said first and second valve head moving means comprising a piston rod fixed with respect to and extending inwardly from said piston member in coaxial relation with respect to said housing member, said first valve head comprising a tubular body portion having an upper end opening through which the terminal end of said piston rod is slidingly received, a coaxial shaft fixed with respect to said second valve head and extending through said first valve seat opening and having a terminal end portion slidingly received within said tubular body portion of said first valve head, means preventing the withdrawal of said piston rod from said upper end opening of said tubular body portion, and resilient means within said tubular body portion constraining said terminal end portion of said coaxial shaft to its innermost position therein as limited by the seating of said second valve head against the underside of said second valve seat.

5. A device for automatically dispensing discrete amounts of chemical concentrate as defined in claim 4, wherein said resilient means within said tubular body portion comprises a second helical compression spring circumjacent said terminal end portion of said shaft and acting between said shaft and the lower end of said tubular body portion.

6. A device for automatically dispensing discrete amounts of chemical concentrate as defined in claim 5, wherein said first helical compression spring is circumjacently disposed with respect to said first valve head member.

7. A device for automatically dispensing discrete amounts of chemical concentrate as defined in claim 6, wherein said first helical compression spring is of greater compressional strength than said second helical compression spring.

8. A device for automatically dispensing discrete amounts of chemical concentrate as defined in claim 7, wherein the distance between the terminal ends of said coaxial piston rod and shaft within said tubular body portion is normally such that said first valve head member will seat in its respective valve seat upon inward movement of said piston before said piston rod will abut the end of said shaft for pushing said shaft down against the reactive urging of said second compression spring.

9. In apparatus for automatically dispensing discrete amounts of chemical concentrates into a swimming pool filter circulatory system including a series-connected water pump and filter in that order along the path of water flow, the combination comprising, first and second chemical concentrate adding units, a first vertical conduit member communicating with the input conduit leading to the water pump, a second vertical conduit member communicating with the output conduit leading from the filter, said first chemical concentrate adding unit being fitted over said first vertical conduit member for discharging chemical therethrough and into said filter circulatory system, said second chemical concentrate adding unit being fitted over said second conduit member for discharging chemical therethrough and into said filter circulatory system, said chemical concentrate adding units each comprising pressure-actuated mechanism for dispensing discrete amounts of chemical into their respective vertical conduit members, and pressure supply conduit means communicating between the output side of the water pump and said dispensing mechanism for supplying water under pressure, upon operation of the pump, for actuating said dispensing mechanism.

References Cited

UNITED STATES PATENTS

| | | | |
|---|---|---|---|
| 852,343 | 4/1907 | Park | 222—447 |
| 2,578,994 | 12/1951 | Dunaway | 222—504 X |
| 2,860,819 | 11/1958 | Ledinham | 222—504 X |
| 3,053,419 | 9/1962 | Palmer | 222—504 X |
| 3,132,775 | 5/1964 | Trumbull et al. | 222—504 X |
| 3,160,331 | 12/1964 | Trumbull et al. | 222—504 X |

FOREIGN PATENTS 308,347  6/1933  Italy.

ROBERT B. REEVES, *Primary Examiner.*

HADD S. LANE, *Examiner.*